INVENTOR
JAN DAVIDSE
BY
[signature]
AGENT

INVENTOR
JAN DAVIDSE
BY
AGENT

INVENTOR
JAN DAVIDSE
BY
Frank R. Jeifari
AGENT

United States Patent Office 3,201,510

Patented Aug. 17, 1965

3,201,510

CIRCUIT ARRANGEMENT IN A COLOR TELEVISION RECEIVER OF THE BEAM INDEX TYPE

Jan Davidse, Eindhoven, Netherlands, assignor to North American Philips Company, Inc., New York, N.Y., a corporation of Delaware Filed May 16, 1960, Ser. No. 29,268

Claims priority, application Netherlands, May 22, 1959, 239,475

10 Claims. (Cl. 178—5.4)

Figure 1:
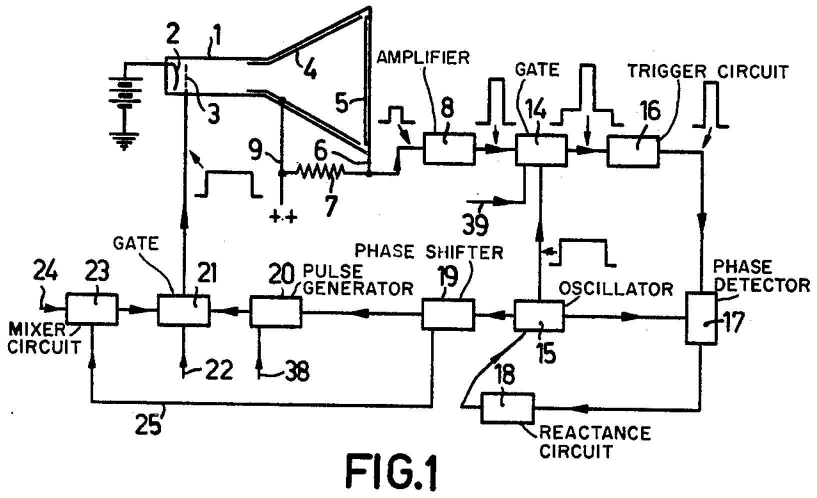

The invention relates to a circuit arrangement in a color television receiver which comprises a picture tube, the picture screen of which is made up of a number of groups of phosphor strips for reproducing the various colors and an indexing strip, associated with each group and extending parallel to the phosphor strips. The picture tube is also provided with an electron beam which is modulated by the video signal which, for that purpose, is supplied to a control electrode of the picture tube, via a first gate circuit which is gated by means of square gating pulses and in which the indexing signals, derived from the mutual through connection of the indexing strips, are taken off via a second gate circuit which is also gated by means of the said gating pulses.

Such a circuit arrangement is disclosed in United States Patent No. 2,736,764 in which a square pulsatory voltage of a frequency of 31 mc./s. is derived from a pulse generator and supplied to a first gate circuit through which the video signal is supplied to a control electrode of the picture tube. During one half of the cycle of the square gating signal, the first gate circuit is opened and the video signal can reach the control electrode for modulating the electron beam. During the other half of the cycle of the gating signal, the gate is closed and the video signal cannot reach the control electrode.

The square gating signal, in opposite phase, is also supplied to a second gate circuit which, consequently, is closed when the first gate is opened and conversely. The indexing signals which are derived from the through connection of the indexing strips are supplied to the mixer stages via this second gate circuit, for converting the received video signal into a signal which is suitable for reproducing the ultimate color picture in the monobeam indexing tube.

Since the second gate is closed when the first gate is opened, the video signal cannot reach the mixing circuit via the second gate circuit, so that no cross-talk between video signal and indexing signal can occur. Conversely, the second gate is opened when the first gate is closed, so that only the indexing signal produced in the picture tube and free from video can be transmitted to the mixer stages.

It will be clear, that in this system care should be taken that the second gate is opened when the electron beam is scanning an indexing strip, since otherwise no indexing signal is produced. On this matter nothing is stated in the said United States Patent specification, but it may be assumed that, to obtain this, the frequency of the pulse generator producing the square gating signal is chosen high, namely 31 mc./s., so that the second gate is invariably opened during one or more parts of the time that the electron beam is scanning an indexing strip.

The drawback is that first of all the output of the indexing strip is not used to full advantage and secondly that now only during half of the time video information is transmitted. The latter objection is self-explaining, the former may be elucidated as follows.

As is known, the signal of the indexing strips is obtained due to the impinging electron beam dislodging secondary electrons which go from these indexing strips to the metal coating provided on the cone wall. Now so-called common secondary electrons may be produced of a low velocity, or uncommon or reflected secondary electrons of a much higher velocity may be dislodged from this material. The former have the advantage that for each primary electron several secondary electrons are dislodged, so that the produced indexing signal has a larger amplitude than in the case of the reflected electrons, in which the impinging electron is reflected. On the other hand, the reflected electrons have a much higher velocity than the common secondary electrons so that the difference in transit time between electrons which are dislodged from the indexing strips at the edges of the screen and those that are dislodged from indexing strips in the centre of the screen is larger for the case of the common secondary electrons than for the reflected ones. The lower the frequency of the square gating signal is chosen, the smaller the influence will be of this transit time effect and the smaller the mutual distances will have to be made between the indexing strips from the edges towards the centre of the screen to be able to compensate this transit time effect. For, the lower the frequency of the square gating signal, the smaller the phase shift occurring in the derived indexing signal when the electron beam is deflected towards the centre of the screen and conversely.

However, in the choice of such a low frequency it is strictly necessary that the electron beam actually impinges on an indexing strip when the gated first gate circuit prevents the video signal from modulating the electron beam and that also simultaneously the second gate circuit which is to pass the indexing signal is opened.

By choosing a low frequency of the gating signal, it is possible to use common secondary electrons for producing the indexing signal, so that then the amplitude of this signal may be larger than in the case of reflected electrons being used.

In addition, the use of common secondary electrons has the advantage that soft material for the indexing strips may be used (reflection requiring hard material for the impinging electrons to be actually reflected), so that the shadows of the indexing strips in the reproduced picture are slighter in the case of common secondary electrons than in the case of the reflected electrons. However, should the fast reflected electron also be used in the case that the frequency of the gating signal is low, for example in the order of 7 mc./s., even then the output is better than when using a high frequency for this signal, for example 31 mc./s., if care is taken that the electron beam is demodulated shortly before and shortly after this beam has passed an indexing strip. This means that when one puts up with the same amplitude of this indexing signal when using a square gating signal of a low and of a high frequency, the indexing strips may be narrower in the case of the low frequency than in the case of the high frequency, so that the time that the video information can be transmitted becomes more favourable. In addition, when using the low frequency also for the fast reflected electrons, the advantage of a smaller phase shift in the produced indexing signal is maintained.

A second drawback in the use of a high frequency for the gating signal is that in that case also the bandwidth of that part of the circuit arrangement in which the indexing pulses are produced and amplified has to be large. Since, however, the noise component of such a circuit arrangement is directly proportional to the root of the bandwidth, and for a large band the output impedance of the various parts of the circuit arrangement must be small, the signal-to-noise ratio decreases as the frequency of the gating signal, and consequently that of the indexing signal, increases.

For example, the load resistor connected between the through connection of the indexing strips and the metal coating on the cone wall, should be small in the case that a large bandwidth is required. However, if a reasonable signal-to-noise ratio is to be realized, the intensity of the electron beam has to be large at the instants that indexing pulses have to be produced, that is to say at the instants at which the video signal is off. However, if the oscillator which produces the gating signal is a free-running oscillator, it is quite uncertain whether the electron beam actually impinges on an indexing strip at the instants that the video signal is off. As indicated above, in the case of the high frequency a large intensity of the beam was required for producing an indexing pulse, so that when the beam impinges on a phosphor strip instead of on an indexing strip with this intensity (and the chance of this is 50% when using a gating signal of a high frequency and an on-time of the video signal which equals the off-time), undue background light is produced.

The circuit arrangement according to the invention is consequently based on the recognition of the fact that the frequency of the square gating signal has to be chosen as low as possible and that in addition measures should be taken to remove the video information from the electron beam at the above instants and to simultaneously open the second gate circuit connected to the said direct connection by means of its input terminal.

The circuit arrangement according to the invention is characterized in that the square gating pulses have a frequency which is the same or an integer multiple lower than that of the produced indexing signals when an unmodulated electron beam is continuously deflected in two directions on the picture screen and in which these square gating pulses are derived from the indexing signals obtained from the said through connection.

In order to obtain the best possible operation of the circuit arrangement according to the invention, a further embodiment of this circuit arrangement is characterized in that the duration of a gating pulse is longer than the time required for the electron beam to scan one indexing strip.

This is based on the recognition of the fact that less stringent requirements need then be imposed on the edge steepness of the gating pulses. For, the video signal should no longer be capable of modulating the electron beam and the second gate circuit should be opened when the electron beam is scanning an indexing strip. Since it is not well possible to produce pulses of an infinite edge steepness, it will take some time before the gating pulses have reached their maximum value required to operate the two gate circuits.

By making the duration of the gating pulses longer than the time required for the electron beam to scan one indexing strip, the time is available to put the video signal off and to open the second gate circuit before the scanning of an indexing strip is started, while, after the relative indexing strip has been scanned, again some time is available to put the video signal on and to close the second gate.

It is noted that such recognition does not appear in United States Patent No. 2,736,764. If in the circuit arrangement described in said United States Patent cross-talk of video in the indexing signal owing to the non-linear characteristic of the picture tube is to be avoided, the edge steepness of the gating pulses must be infinite. At a frequency of 31 mc./s. this is even more difficult to realize than at a frequency of 7 mc./s.

Figure 2:
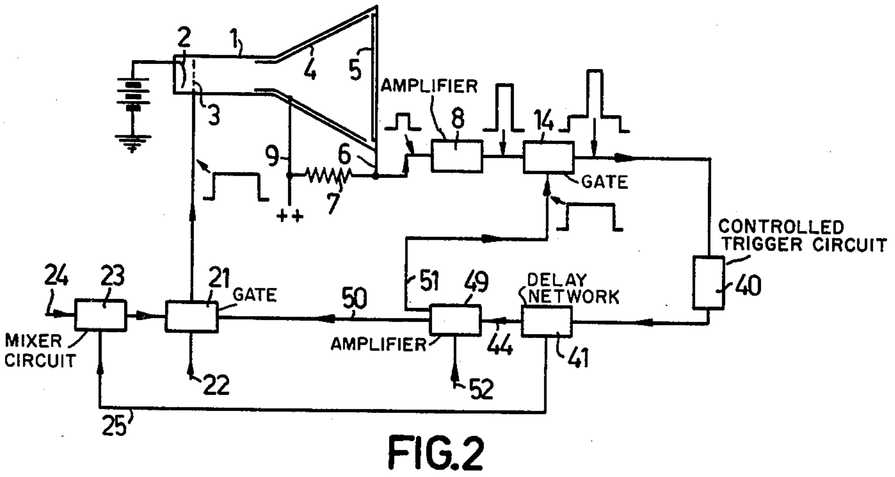
Figure 3:
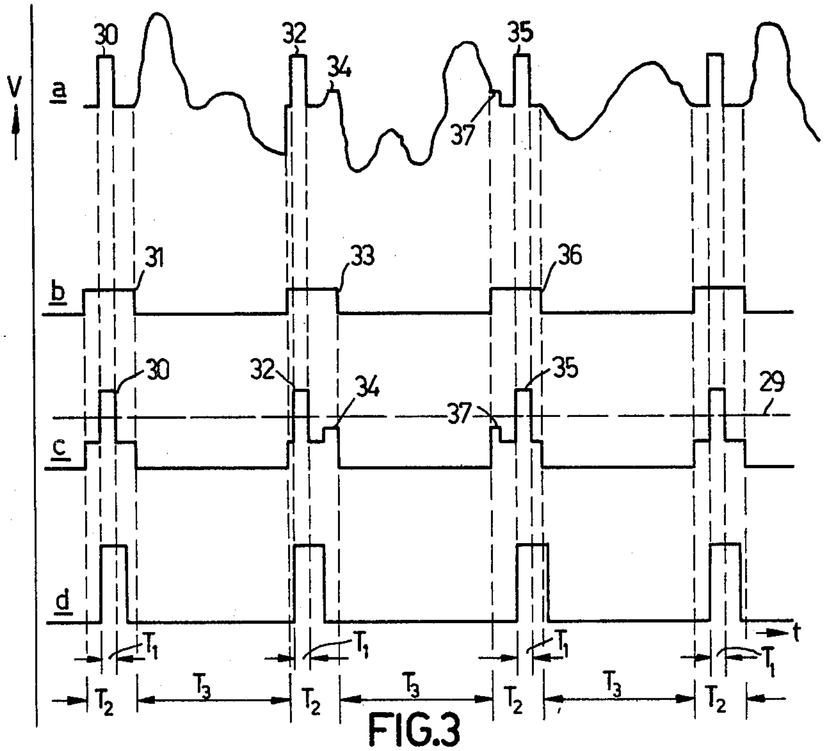
Figure 4:
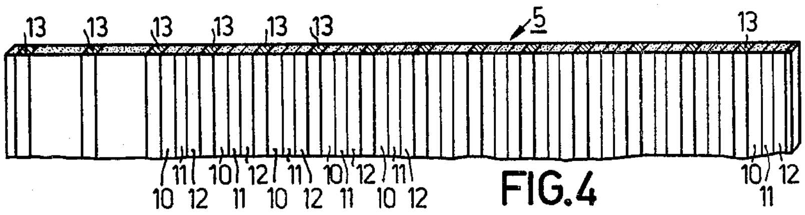
Figure 5:
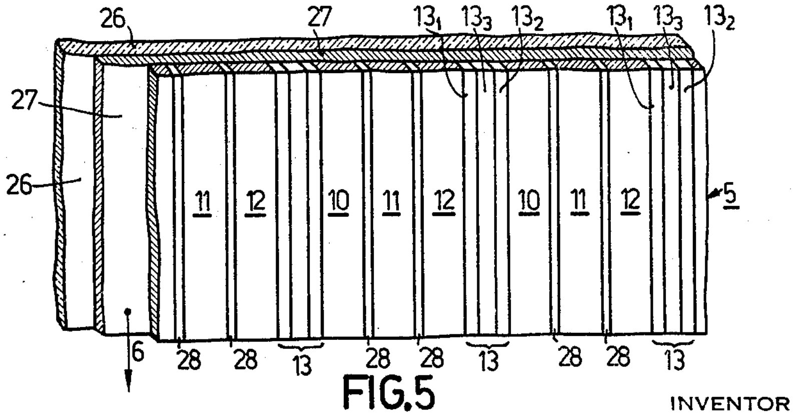
Figure 6:
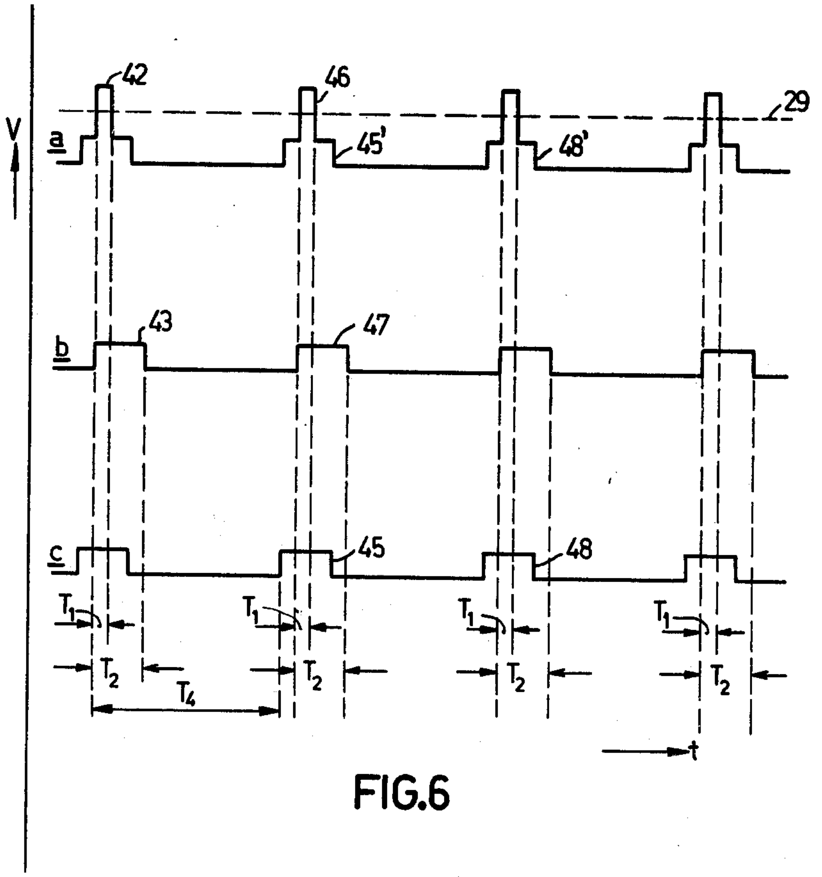

In order that the invention may be readily carried into effect, some embodiments of circuit arrangements according to the invention and of a picture tube used in these circuit arrangements will now be described, by way of example, with reference to the accompanying drawings, in which FIGURE 1 is a first embodiment, in which the required square gating pulses are produced by means of a regulated oscillator, FIGURE 2 is a second embodiment in which the produced indexing pulses are used to control a trigger circuit, FIGURE 3 is a voltage-time diagram illustrating the operation of the invention, and FIGURES 4 and 5 show the preferred embodiment of the picture screen provided in the picture tube used and FIGURE 6 again serves for a good understanding.

In FIGURE 1, the picture tube is indicated by 1 provided with a cathode 2, a Wehnelt cylinder 3, a terminal anode 4 and a picture screen 5, while the other parts of this picture tube not essential for the invention are omitted. In this embodiment, the cathode 2 is driven positive relatively to earth to obtain the required negative bias voltage, and the video signal, as well as the associated gating pulse, is supplied to the Wehnelt cylinder 3. It will be clear that also the reverse case is possible, namely that the Wehnelt cylinder 3 is provided with a fixed negative bias voltage with respect to the cathode 2, and the video signal is supplied to the cathode 2 with opposite polarity.

The electron beam emitted by the cathode 2 is accelerated by the accelerating anode (not shown) and the terminal anode 4 and impinges on the picture screen 5. On this picture screen, mutually connected indexing strips of a high secondary emission coefficient are provided (the way in which this is done will be described below) so that each time the electron beam passes an indexing strip, either common or reflected secondary electrons are dislodged. These electrons go to the terminal anode 4 as a result of which a pulse is produced across the resistor 7 connected between the through connection of the indexing strips 6 and the terminal anode 4, and supplied to the amplifier 8.

Since the frequency of the produced indexing signal is approximately 7 mc./s., the bandwidth of the picture tube to be considered as an amplifier tube for the indexing signals, may be smaller than when the frequency of the indexing signal amounted, for example, to 31 mc./s. So the value of the resistor 7 may be larger. If the same amplitude of the indexing signal is to be obtained, the intensity of the beam may be lower when low frequencies are used than when high frequencies are used. This is favourable in connection with the focussing and background light, if any.

The terminal anode 4 consists of a metal coating provided on the cone wall of the tube 1. This coating is connected to a source of high voltage via a conductor 9 passed to the outside. The secondary electrons will have to travel a longer path to the terminal anode 4 when they are dislodged from indexing strips in the centre than from indexing strips at the edges of the picture screen 5. The lower the frequency of the ultimately obtained indexing signal, the smaller the effect of this transit time difference will be and, since this frequency is determined by the frequency of the gating signal, the latter frequency should be chosen as low as possible. This is determined by the following factors.

FIGURE 4 shows the picture screen 5 of an indexing tube. In this figure, the phosphor-covered strips for luminescing in the red, the blue and the green color are indicated by the numerals 10, 11 and 12 respectively. Three of these mutually electrically insulated strips together constitute a group and the whole picture screen is made up of a number of these groups. Between these groups of phosphor strips, the indexing strips 13 are arranged composed of an electrically conductive material of such as secondary emission co-efficient that either common secondary or reflected electrons are dislodged from these indexing strips when they are impinged by the electron beam. For that purpose, the electron beam is constantly deflected line-wise from left to right in the horizontal direction on the screen 5 shown in FIGURE 4. If the electron beam is unmodulated, a pulse will be produced across a resistor 7 each time when the beam passes an indexing strip. In this manner, the frequency of the indexing signal is determined by the velocity at which the beam is deflected in the horizontal direction. This means that the frequency of the indexing signal is dependent on the number of indexing strips on the screen 5 and on the frequency of the line deflection signal. In normal indexing tubes for a system of 625 lines and 25 pictures per second, this frequency is in the order of from 7 to 8 mc./s.

On the other hand, in gating, that is to say releasing the electron beam only at certain instants to form an indexing signal, the frequency of the indexing signal is determined by the frequency of the releasing signal. Since, as already explained above, the difference in transit time between secondary electrons from the centre or from the edges of the screen 5 has the smallest effect when the frequency of the indexing signal is as low as possible, the frequency of the square gating signal, according to the principle of the invention, is chosen equal to the frequency of the indexing signal which would be produced when an unmodulated electron beam is constantly deflected line-wise on the picture screen. It is noted that by unmodulated is to be understood in this connection that neither video signal nor gating pulses are supplied to the Wehnelt cylinder 3.

In order that the beam is actually released to form an indexing pulse at the instant at the beam passes an indexing strip during deflection, the gating pulses are derived from the indexing signals obtained from the through connections 6.

For that purpose, the indexing signals of the embodiment shown in FIGURE 1 are supplied to the gate circuit 14 after amplification in the wide band amplifier 8 which has to transmit the indexing pulse in an amplified and undistorted condition. From the oscillator 15, gating pulses are also supplied to gate circuit 14 to open this gate during the time period in which an indexing pulse may be expected. The thus passed indexing pulses control a trigger circuit 16. This trigger is adjusted so that it flips over only at a level which considerably exceeds the level of the signal which would be transmitted by the gate circuit 14 when only the gating pulses of the oscillator 15 would be operative. In addition, the trigger circuit 16 is set so that its flipping over is determined by the leading edge of an indexing pulse, and this leading edge is in turn dependent on the instant at which the electron beam starts scanning an indexing strip. In this manner the exact information is obtained on the instant at which a group of three phosphor strips is scanned and correction, if any, has to be applied in connection with non-linearities of the sawtooth signal used for the horizontal deflection. The trailing edge of the indexing pulse is not so important, so that for the trigger circuit 16 a monostable multivibrator may be used which flips over by the signal from 14 and thereby delivers a pulse of a duration which may be longer than the duration of the indexing pulses. The pulse obtained from the trigger 16 is supplied to the phase detector 17. This phase detector 17 likewise receives a comparison signal derived from the oscillator 15, so that the output voltage of phase detector 17 is dependent on the phase difference between indexing and oscillator signal. The output voltage of 17 is supplied to the reactance circuit 18 by means of which the oscillator 15 may be re-adjusted.

It will be clear that also a trigger circuit 16 may be made which does not react to the leading edge but to the trailing edge of an indexing pulse. In that case, the location of the trailing edge should be sharply defined and that of the leading edge is less important.

In this manner, the square gating signal is derived from the indexing signal and constant synchronisation is achieved between the indexing signals and the gating signals.

The signal produced by the oscillator 15 is also supplied, via the phase shifter 19, to the pulse generator 20, the output pulses of which are used as gating pulses for the gate circuit 21. The phase shifter 19 serves to correct transit time effect, if any, occurring in the circuit arrangement or in the tube 1, so that the gating pulses derived from 20 actually release the electron beam for producing an indexing signal at the instant determined by the control circuit comprising the elements 14, 15, 16, 17 and 18.

If the oscillator 15 is a relaxation oscillator, the circuit arrangement 18 need not be a reactance circuit, and another circuit may be used instead, as a result of which the output voltage of 17 can be supplied to the oscillator 15 for readjusting the oscillator frequency.

The first gate circuit 21, for which, for example, a circuit of the known four or six diodes type may be used, is connected to a fixed reference level via conductor 22.

If, during the time that the gating pulses are derived from 20, the Wehnelt cylinder 3 is brought to this reference level, the voltage at the Wehnelt cylinder 3 is such that the intensity of the electron beam is sufficiently high to produce an indexing signal of a sufficiently large amplitude when impinging on an indexing strip. This is of importance in connection with the remaining part of the circuit arrangement.

If the amplitude of the indexing pulse produced across the resistor 7 is large enough which, naturally, is determined by the secondary emission coefficient of the material of which the indexing strips are composed and by the intensity of the released electron beam, the amplification of the amplifier 8 may be of a small value or the amplifier 8 may even be omitted.

To the first gate circuit 21 is also supplied the converted video signal derived from the mixer circuit 23. Normally, this video signal, which contains both the color information and the brightness information of the picture to be reproduced, is supplied to the Wehnelt cylinder 3, but during the gating pulses this video signal is put off and the reference signal is put on.

The conversion of the video signal is carried out in a manner known per se by supplying to the mixer circuit 23 the video signal via the lead 24 and the oscillator signal via the lead 25. If, owing to the said non-linearity in the horizontal deflection signal, the frequency of the indexing signal changes, the signal developed by the oscillator 15 is re-adjusted by means of the described control circuit, as a result of which the gating pulses which are supplied to 14 and 21 also vary, as well as the conversion signal supplied to 23 via the lead 25, so that both synchronisation of the gating signal with the deflection of the beam and a correct reproduction of the colors by means of the described circuit arrangement is obtained.

A possible conversion of the video signal in the mixer circuit 23, when a color television signal in accordance with the American N.T.S.C.-system is received and the decoding of this signal takes place in the picture tube 1 itself, is as follows:

The sequence of the phosphor strips should be such as shown in FIGURES 4 and 5, and for a correct reproduction it is necessary that the frequency of the color subcarrier wave on which the color signals are modulated in the N.T.S.C.-system, is converted into the frequency of the gating signal. For that purpose, this color subcarrier wave may be replaced, for example in the mixer circuit 23 by means of frequency transformation, by the oscillator signal derived from 15 (which for that purpose should preferably have a sinusoidal character), which, after that, serves as a color subcarrier wave for the converted video signal. In that case, the signal supplied to 21 consists of the color signals modulated on the oscillator signal plus the brightness signal. This signal is such that the suppression of the video signal during the scanning of the indexing strip 13 is just necessary to render a satisfactory decoding of the signal possible.

Naturally, in the frequency transformation in the mixer circuit 23, care should be taken that the phase modulation of the color signals remains occurring in the sequence red, blue, green. Should this not be the case, for example when the sequence of the phase modulation inverts, also the sequence of the strips 10, 11 and 12 on the picture screen 5 should be inverted.

Another decoding method is that in which the mixer circuit 23 comprises three gating tubes. To these three gating tubes, the demodulated color signals plus their brightness information are supplied in known manner. The three gating tubes are gated by the signal from the line 25 in such a manner that the green gating tube is opened when the electron beam passes the green strip, the blue gating tube when the blue strip is passed and the red gating tube when the red strip is passed. All three gating tubes are closed when the beam is scanning the indexing strip and at that instant, a fourth gating tube can be opened by the gating signal, to a control grid of which tube the reference voltage is supplied. If the four output electrodes of these four gating tubes are connected to each other and to the Wehnelt cylinder 3, a circuit arrangement is realised as shown in FIGURE 1 by means of the blocks 21 and 23.

In order to achieve the best possible control, two more measures have been taken in a further embodiment of the circuit arrangement according to the invention and in the picture tube used.

In the first place, the duration of the gating pulses is longer than the duration of the indexing pulses and, secondly, each indexing strip on the picture screen is subdivided into two so-called black indexing strips and one active indexing strip.

This is shown with reference to the FIGURES 3 and 5. FIGURE 3*a* shows the signal as produced across the resistor 7 when the duration of the gating pulses which are supplied by the pulse generator 20 is as shown in FIGURE 3*b* and the indexing strips 13 are subdivided in the above manner as shown in FIGURE 5.

This latter figure shows a part, on an exaggerated scale, of the picture screen 5 shown in FIGURE 4. The said screen comprises a glass plate 26 on which an electrically conductive layer 27 is provided, the through connection 6 of which layer 27 is passed to the outside. It is noted, that the through connection 6 should not always be passed to the outside conductively but that it may also be done capacitively. Particularly for structural reasons, the latter may often be preferred.

On the layer 27, the phosphor strips 10, 11 and 12 are provided which are separated mutually by the strips 28. Each indexing strip 13 is subdivided into so-called black strips $13_1$ and $13_2$, which may be composed, for example, of material having the smallest possible secondary emission coefficient, and into the active strips $13_3$, which consists of material having a secondary emission coefficient which is larger than that of the strips $13_1$ and $13_2$. The active strips $13_3$ should make a satisfactory electric contact with the layer 27.

If common secondary electrons are to be produced by means of the active strips $13_3$, magnesium oxide may be used as material for these strips. If, on the contrary, reflected electrons are to be produced, bismuth oxide may be used for the composition of the strips $13_3$. In front of the strips 10, 11, 12 and 13 a so-called Metal backing may be provided of electrically conductive material in order to obtain a better light output. If desired, the layer 27 may then be omitted and the strips may be provided directly on the glass wall 26, the metal backing serving as a through connection for the indexing strips 13, so that the conductor 6 should be connected to this metal backing.

The duration $T_2$ of the gating pulses shown in FIGURE 3*b* which are likewise supplied to the gate 14 is chosen such that the video signal, apart from the phase deviations to be discussed hereinafter, is disconnected and the gate 14 opened each time at the instants at which the electron beam leaves a strip 12 and starts scanning a strip $13_1$. The video signal is again put in and the gate 14 is closed again at the instants at which the beam leaves a strip $13_2$ and starts scanning a strip 10.

Said measures are taken for three reasons:

(1) As already described in the introduction, the duration of $T_2$ sec. of the gating pulses should be longer than the duration of $T_1$ sec. of an indexing pulse, since then fewer requirements are imposed on the edge steepnesses of the gating pulse.

(2) Allowance should be made for control, that is to say, the indexing pulses must be capable of shifting to and fro across the gating pulses as will be explained below. This means that the gating pulse must invariably have reached its constant peak level before the electron beam starts scanning an indexing strip. Should this not be the case, the indexing pulse might appear entirely or partially before the leading edge or behind the trailing edge of the gating pulse, as a result of which flipping over of the trigger circuit 16 no longer occurs at the exact instants.

(3) The black strips are provided to see to it that, when the electron beam, by applying the reference level, has reached a definite intensity which is independent of the video information, the least possible light is produced by this electron beam, since otherwise an incorrect picture reproduction would be the result. As already stated above, the reference level should be applied longer than is necessary for scanning an active indexing strip $13_3$. So, if no light has to be produced during this longer gating time, two black strips $13_1$ and $13_2$ should be provided around an active indexing strip $13_3$ which emit no light when they are struck by the electron beam. It appears from FIGURE 3*a* that the indexing signals 30, 32 and 35 invariably have the same amplitude and that around these indexing signals a fixed level is set. The said amplitude and the level are determined by the intensity of the scanning electron beam during the gating pulses and by the secondary emission coefficient of the strips $13_3$ insofar as the amplitude is concerned and by the strips $13_1$ and $13_2$ insofar as the level is concerned. By this means two advantages are realized:

(1) It is sure that invariably an indexing signal of a fixed amplitude is produced with the materials available for producing secondary electrons. This advantage may be explained with reference to FIGURE 3*a* namely by means of the situation around the indexing pulse 32. The video signal around this pulse has a very small value (dark region in the picture to be reproduced) so that, if the beam had not been given the desired intensity by the gating pulse 33, no indexing pulse at all had been produced.

(2) Since the amplitude of the indexing pulses has a fixed value, the indexing signal can invariably and with great certainty be separated from the gating signal by means of an amplitude selective method, which gating signal, in turn, sees to it that no video signal can reach the indexing signal. (See for example the peak after indexing pulse 30 and before indexing pulse 35 caused by the video information.)

This is explained with reference to FIGURE 3*c* which shows the output signal of the gate circuit 14. It appears from this figure, that the video signal which, in the signal shown in FIGURE 3*a*, each time occurred for a period of $T_3$ sec., being the time in which the electron beam is scanning the strips 10, 11 and 12, has been removed by the action of the gate 14. This occurrence of video information in the signal derived from the through connection 6 is caused by the fact mentioned already that also the phosphor strips have a certain secondary emission coefficient. Particularly when very bright regions are to be reproduced in the picture, it may happen that a phosphor strip delivers a larger number of secondary electrons than an active indexing strip, notwithstanding the fact that the secondary emission coefficient of the active indexing strips is larger than that of the phosphor strips. If the thus formed video signal should not be removed, the trigger circuit 16 would be caused to flip over by the video signal when the amplitude of the video signal exceeded that of the indexing pulses, as a result of which the control of the oscillator frequency would be disturbed. In other words, the penetration of video signals into the indexing signal is to be considered as an undue interference.

It is also possible to choose the reference level applied to the gate circuit 21 through lead 22 so high that the beam current, when impinging on an active indexing strip $13_3$, is invariably larger than in the brightest region in the picture to be reproduced. However, with this large beam current also the diameter of the electron beam will be enlarged owing to the focussing becoming worse, as a result of which the indexing pulses proper are deformed and the leading edges of these indexing pulses are no longer sharply defined.

The output signal of 14 shown in FIGURE 3*c* causes the trigger circuit 16 to flip over when it passes the level indicated by the line 29. With this it is attained that this flipping over is invariably caused by the leading edge of the indexing pulse, as a result of which all informations about the instants at which the beam starts scanning an active indexing strip is available in the output signal of the trigger 16.

If desired, also a different kind of amplitude selective separating circuit may be used for the trigger circuit 16. For that purpose, the circuit 16 may comprise a biased amplifier tube which is released only when the indexing pulses exceed the level 29. A trigger circuit, however, has the advantage that an output pulse of sufficient amplitude and of the desired edge steepness can be obtained with relatively few tubes (for example one or two).

It is also possible to give the circuit arrangement 14 such proportions that it opens only when both signals, that is to say from 8 and from 15, are operative simultaneously. The output signal of 14 thereby assumes a corresponding form.

It is also clear from FIGURE 3*c* how the indexing pulse can shift across the gating pulse when phase difference occurs between the indexing pulses proper and the gating signal. For that purpose, three cases are shown in FIG. 3. In the first case, namely when the first indexing pulse 30 occurs, there is no phase difference between this indexing pulse and the first gating pulse 31. That means, the indexing pulse lies midway the gating pulse, and this latter sees to it that the video signal is just off and the gate 14 opened during the scanning of an indexing strip 13 by the electron beam.

In the second case, so during the second indexing pulse 32, the indexing pulse leads the second gating pulse 33. In other words, the indexing pulse occurs at the edge of the gating pulse and the beam begins to scan a black strip $13_1$, before the video signal is off and before the gate 14 is opened. As appears from FIGURE 3*a*, the signal at the through connection 6 has, thanks to the black strips, a fixed level around the occurrence of the indexing pulse 32. Owing to the fact that the reference level is maintained, also at the beginning of the scanning of a strip 10 following the scanning of an indexing strip 13 which was the cause of the formation of an indexing pulse 32, a voltage jump 34 is formed which, however, is smaller in value than the indexing pulse 32 because the secondary emission coefficient of the phosphor material of which the strip 10 is composed is smaller than that of the material of the relative active indexing strip $13_3$. The level indicated by the line 29 should be chosen so that the voltage jump 34 which will also occur in the output signal of gate 14, does not result in flipping over of the trigger 16.

In the above it is assumed that the secondary emission coefficient of the phosphor strips is somewhat larger than that of the black strips. If these coefficients are equal, the level of 34 is of equal height than that of the black strips. If the coefficient of the phosphor is smaller than that of the strips $13_1$ and $13_2$, the level of 34 lies below that around indexing pulse 32.

For the third case, namely at the occurrence of the third indexing pulse 35, this indexing pulse lags with respect to the third gating pulse 36. During the scanning of the preceding strip 12, the video signal will already be off and the reference level will be on. As a result of this the voltage jump 37 is formed which again has no influence thanks to the right choice of the level indicated by the line 29. For the jump 37 the same considerations hold as for the jump 34 as far as the secondary emission coefficients are concerned.

A drawback in both cases is that the strips 12 and 10 produce light which is independent of the reference level and not of the video signal. So the phase deviations occurring should be kept as slight as possible. As a matter of fact, this is a general requirement since otherwise color distortions would occur in the reproduced picture. This drawback might be avoided by choosing the duration of the gating pulses shorter than the time required for the electron beam to scan an indexing strip, that is to say active strips plus black strips. Since, however, the duration of a gating pulse must be larger than that of an indexing pulse, this will usually result in a widening of the black strips. In order not to exaggerate the striation of the reproduced picture, one may not proceed too far with this.

The above arrangement results in an output signal of the trigger circuit 16 as shown in FIGURE 3*d*. The leading edges of these latter pulses are sharply defined, the trailing edge is of less importance. In this example, the duration of the trigger pulse is chosen longer than that of the indexing pulse.

In the case of deviating phase between indexing pulse and gating pulse, the phase detector 17 produces an output voltage which reduces this phase difference as much as possible by readjusting the oscillator 15 via the reactance circuit 18.

It should be noted in this connection that after the trigger 16 the shape of the pulse does not matter and only the phase is of importance. For example, in the phase detector 17 the fundamental frequency of the trigger signal could be compared with a fundamental frequency of the gating signal. In that case, the oscillator 15 may be constructed as a sine oscillator which has the advantage of a large frequency stability. Between 15 and 14 a pulse generator should then be connected which converts the sinusoidal signal of 15 into the gating signal for gating the gate 14. In that case, the pulse generator 20 should also distort the signal of 15 to a gating signal for the gate circuit 21.

In addition it should be noted that the delay in passing the circuits 15, 17 and 18 should be as small as possible in order that the oscillator can be re-adjusted as rapidly as possible since otherwise undue color distortions would occur in the reproduced picture.

In addition, the difficulty of coming into step presents itself in this circuit arrangement each time at the beginning of a new scanning of a line. In the present embodimment this is solved, as shown in FIGURE 4, by providing some indexting strips 13 on the picture screen 5 before the phosphor strips proper 10, 11 and 12 start. At the same time, a delayed and possibly widened or shortened line flyback pulse, which may be derived from the line deflection circuit, is supplied, via the lead 38, to the pulse generator 20 and, via the lead 39, to the gate circuit 14. At the same time the video signal is suppressed during the occurence of this delayed flyback pulse. This occures already owing to the fact that during the so-called back porch of the line blanking no video information is available in the video signal supplied via the lead 24. If it is ensured that the flyback of the beam is finished at the beginning of this back porch and that the delayed line flyback pulse puts in the reference level and opens the gate 14 during the occurrence of the said back porch, the beam starts scanning the screen on the left as shown in FIGURE 4 and passes three indexing strips 13 before scanning phosphor strips 10, 11 and 12. (In the present example three indexing strips are used. It will be clear that more or fewer strips may be used according to the time required and/or available to bring the oscillator 15 into synchronisation with the indexing signals at the begining of each line.) During this time, the reference level should be on and indexing pulses are produced only since between the first three indexing strips material is provided from which as few secondary electrons as possible can be dislodged. Also the puting off of the video signal during this time is strictly required since otherwise intermodulation between video signal and indexing signal might occur owing to the nonlinear characteristic of the picture tube 1. In such an intermodulated signal, the vidio signal can no longer be separated from the indexing signal, so that this should be prevented at all times. Should, consequently, the duration of the back porch be insufficient to be sure that the oscillator 15 is in step with the indexing signal at the end of the back porch, the delayed line flyback pulse having a polarity which suppresses the video signal may also be supplied to the device 23. It is not necessary that the phosphor strips between the first three indexing strips are invariably lacking. The main thing only is that, if both gate circuits are open during the coming into step of the oscillator 15, no light is produced since this would be undue background light. It is possible, for example, to make the first three indexing strips, together with the phosphor material provided in between them, appear behind the mask surrounding the picture tube. Any light produced by these phosphor strips is then intercepted by this mask.

It will be clear that, in addition to the phase shifting network 19, other phase shifing networks may be included in the circuit to correct possible results of transit time phenomena and the like in amplifiers and trigger arrangements.

Finally it is stated, if desired, the value of the reference level may be caused to vary in the rhythm of the line frequency and/or the picture frequency. This may be necessary to correct the difference in focussing of the electron beam when scanning at the edges or in the centre of the screen and the difference in layer thickness of the active indexing strips. Such a difference in layer thickness between the edges and the centre of the screen may be the result of the application of the material when manufacturing the picture screen.

The variation of the reference level may be such for example that the intensity of the electron beam at the edges of the screen is higher than in the centre. Such a variation may be obtained by deriving the voltage which is supplied to the gate circuit 21 through the lead 22 from the line deflection generator and the picture deflection generator. For that purpose the sawtooth signal with line frequency may or may not be integrated and added to or multiplied by the integrated sawtooth signal with picture frequency. If desired, a constant voltage may be added which, together with the two integrated signals, determines the minimum or the maximum of the reference level when the electron beam, during scanning, is exactly in the centre of the picture screen.

A second embodiment, in which corresponding parts have been given numerals corresponding as much as possible to those in FIGURE 1, is shown in FIGURE 2. The difference with the circuit arrangement as shown in FIGURE 1, is that the free-running oscillator 15 is replaced by a controlled trigger circuit 40. This trigger 40 may operate in a corresponding manner as the trigger circuit 16 shown in FIGURE 1 and may, for that purpose, be constructed as a monostable multivibrator. The output signal of 14 again causes the trigger circuit 40 to flip over when it exceeds the level indicated by the line 29. The pulse duration of the pulses supplied by 40 equals $T_2$ sec. and therefore corresponds to the time required for the electron beam to scan an indexing strip 13. The gating pulses supplied by 40 are delayed in the delay network 41 for a period which is somewhat smaller than the period of the indexing signal. For example, the indexing pulse 42 shown in FIGURE 6*a* (FIGURE 6*a* corresponds to FIGURE 3*c*) causes the trigger circuit 40 to flip over and since the latter reassumes its stable state after $T_2$ seconds, a gating pulse 43 is formed as shown in FIGURE 6*b*. This impulse 43 is delayed in the network 41 over a period of $T_4$ seconds, so that at the conductor 44 a pulse 45 is formed (see FIGURE 6*c*) which may serve as a gating pulse 45' (see FIGURE 6*a*) to put on the reference level and to open the gate circuit 14, so that the indexing pulse 46 following indexing pulse 42 may appear at the output of 14.

In a corresponding manner, indexing pulse 46 causes the pulse 47 to appear at the output of 40, which, after delaying in 41, is available as gating pulse 48.

The gating pulses derived from 41 are supplied, via the said lead 44, to an amplifier 49, after which the delayed gating pulses are supplied, via the leads 50, to the gate circuit 21 and, via the lead 51, to the gate circuit 14. If necessary. difference in delay may be introduced between the gating pulses supplied via the leads 50 and 51 in connection with the delay in the picture tube 1 and the amplifier 8.

For the conversion of the video signal, the pulses of the delay network 41 are supplied to the mixer circuit 23 via the lead 25. If necessary, the delay of the pulses derived from 41 via 25 may be different from that of the pulses which are derived from 41 via the lead 44 and it should be possible to vary this delay time, if necessary, to adjust the correct tint of the colors to be reproduced. In order to be able to start the circuit arrangement in this case also at the beginning of a line scanning, a delayed line flyback pulse is supplied to the amplifier 49 via the lead 52 in a corresponding manner as the supply in FIGURE 1 to the leads 38 and 39. Also in this case, some indexing strips 13 are provided on the left hand side of the picture screen 5 and since the delayed line flyback pulse connects the reference level to the Wehnelt cylinder 3 and opens the gate 14 during the occurrence of the back porch of the line blanking, indexing pulses will be produced. Theoretically, it would be sufficient to provide one or two indexing strips on the left hand side of the picture screen before the phosphor strips 10, 11 and 12. To ensure a good start of the circuit arrangement, however, more indexing strips may be provided for this purpose.

If the output pulses of 41 are large enough for the required gating action, the amplifier 49 may be omitted. In that case, the line flyback pulses supplied via lead 52 should be supplied to the gate circuit 14 and to the gate circuit 21 or the mixer circuit 23.

It is noted that the delay network 41 may also be connected before the trigger circuit 40. In that case, however, the leads 44 and 25 should be connected to the output terminals of the trigger 40. In this latter case, the delay network should not cause any distortion of the indexing pulses, since otherwise the leading edges are no longer sharply defined. In the case of the gating pulses, a small distortion is less dangerous, since by using the black strips, some variation in edge steepness is possible. The arrangement as shown in FIGURE 2 is therefore to be preferred.

It will be clear that the above two manners of deriving the gating pulses from the indexing pulses may be extended. For example, the circuit arrangement shown in FIGURE 2 has the drawback that, if one of the indexing pulses should fail during the scanning of a line, the whole circuit arrangement stops. This may be cured by using no monostable multivibrator for the trigger circuit 40 but a free-running oscillator and synchronizing the latter directly with the indexing pulses from 14. Now, if an indexing pulse fails, the free-running oscillator may come out of step, but after some cycles of the oscillator oscillation, the gated electron beam is likely to impinge on an indexing strip, as a result of which synchronization is established again simultaneously. This may be promoted by applying a so-called search voltage which varies the oscillator frequency at a definite rate.

This search voltage may also be useful for starting, so that the video signal should then be off for a shorter period at the beginning of a line than without this search voltage.

Such a search voltage may also be used in the circuit arrangement as shown in FIGURE 1. Particularly at the beginning of a line, the fast coming into step will thereby be promoted. This may be realized, for example, by including a search voltage oscillator in the loop formed by the elements 15, 17 and 18. This search voltage oscillator cuts off automatically in a manner known per se when coming into step.

In the case of the circuit arrangement as shown in FIGURE 2, having a free-running oscillator, there should be seen to the search voltage being cut off at the instant at which synchronization is established.

In the circuit arrangement shown in FIGURE 2 a so-called integrator may be included which opens the two gate circuits 14 and 21 and cuts off the video signal as soon as an indexing pulse fails, if the circuit 40 is a trigger circuit. This may be for example a rectifying circuit arrangement which rectifies the produced indexing signal. The negative direct voltage produced by the rectifying circuit arrangement blocks the gates 14 and 21, which blocking is released, in the case of the gate 14, by the gating signal and, in the case of the gate 21, by the gating signal and by the video signal. The positive direct voltage produced simultaneously by this rectifying circuit arrangement removes a negative bias voltage for the mixer circuit 23 applied for blocking purposes, so that the video signal is allowed to appear normally.

If the indexing signal fails, both the negative direct voltages and the positive direct voltages will not occur. The gates 14 and 21 are opened and the mixer circuit 23 is blocked. Indexing signals may be produced, as a result of which the trigger circuit 40 may become operative again. The time constant of the said rectifying circuit arrangement should be such that some indexing pulses can be formed before the positive and negative direct voltages reach their full value.

Also the strips need not always be positioned vertically as shown in the FIGURES 4 and 5, but may also have horizontal positions. In that case, the electron beam is deflected linewise, and, at the same time, this beam is wobbled in a vertical direction over the horizontally positioned strips with a frequency which is high with respect to the line frequency. This wobbling occurs by means of a separate deflection mechanism which is controlled by an oscillator which supplies a signal having the frequency of the color subcarrier wave, when a signal is received which is built up, for example, in accordance with the American N.T.S.C.-system. The output signal of this oscillator is compared in phase with a signal from the oscillator 15 or from the generator 40 constructed as a free-running oscillator. Then, the result of this phase comparison is supplied to the separate deflection mechanism, so that herewith the required phase relation between video signal and wobbling signal supplied to the Wehnelt cylinder is obtained. The picture screen 5 may again be constructed so that each time an indexing strip is provided after three phosphor strips, and the amplitude of the wobbling signal should be so that during the linewise scanning, the beam is each time wobbled over a packet of four strips. Geometrically, the indexing strip may then be the lowest strip, the highest strip, or a strip lying in between the phosphor strips of a packet of four. In order to render direct decoding in the tube itself of a color television signal built up in accordance with the American N.T.S.C.-system possible, the application from the top to the bottom per wobbled packet of four will be made to extend according to a scheme of blue, green, indexing and red strip.

In such a decoding system, the frequency of the wobbling signal preferably equals the frequency of the color subcarrier wave which is used in the N.T.S.C.-system to transmit the color signals, while conversion of the color signal itself is not necessary.

Owing to the described application of the indexing strips, the frequency of the indexing signal, without any special measures, would be about twice as high as that of the wobbling signal.

The characteristic feature of these special measures is that the frequency of the oscillator 15 or 40 is chosen an integer multiple lower, that is to say in this case twice as low, as the frequency of the indexing signal which would be produced if an unmodulated electron beam of the frequency of the color subcarrier wave should be wobbled over the strips.

When an indexing strip is passed for the second time in one scanning of a packet, an indexing pulse may be produced in normal operation (dependent on the strength of the video signal at this instant), but the second gate circuit 14 is closed, so that the thus produced indexing pulse does not appear in the output signal of 14.

Should, on the contrary, a different decoding system be used, in which the sequence of the strips may be blue, red, green, indexing strip, the frequency of the indexing signal produced by an unmodulated beam would be equal to that of the wobbling signal and consequently, it is not necessary to take any special measures.

Establishing synchronization of the oscillator 14 or 40 at the beginning of each line may, in this case, be effected by extending the indexing strips to the left with respect to the phosphor strips. During the back porch of a line blanking, the beam may already be wobbled to and fro a few times on the left side of the screen, without passing phosphor strips. In a similar manner as described before, some indexing pulses may then be obtained to bring the oscillator into synchronization before the video signal is dislodged at the end of the back porch.

It will be clear, that wherever indexing strips are mentioned in the preceding lines, these strips are provided between the phosphor strips. However, these indexing strips may also be placed as grid wires for the picture screen, so that they are struck by the electron beam before this beam impinges on the picture screen. Instead of strips of material with a secondary emission coefficient, also strips may be used which are composed of a material which radiates ultra violet or a different kind of light falling outside the visible spectrum when being struck by the electron beam. In that case, a photoelectric cell sensitive to the light produced by the indexing strips should be provided behind the picture screen in a manner such as to receive the light of all the indexing strips. If necessary, several photoelectric cells, connected in parallel, may be used for this purpose.

What is claimed is:

1. A color television receiver comprising an image reproducing device having a screen and electron gun means for directing a beam of electrons toward said screen, said screen comprising a plurality of groups of parallel phosphor stripes responsive to said beam to reproduce color information, said groups being separated by indexing stripes extending parallel to said phosphor stripes, said indexing stripes being responsive to said beam to produce an indexing signal, means for scanning said beam in a direction normal to said stripes, first gate circuit means, means applying said indexing signals to said first gate circuit means, a source of a video signal, second gate circuit means, means applying said video signal to said second gate circuit means, means applying the output of said second gate circuit means to said electron gun means to modulate said beam, means for opening said first and second gate circuit means comprising means providing gate signals, means applying said gate signals to said first and second gate circuit means, and means connected to the output of said first gate circuit means for controlling the frequency of said gate signals, the frequency of said gate signals being integrally related to and no greater than the rate at which said beam scans successive said indexing stripes.

2. The receiver of claim 1, in which said phosphor stripes and indexing stripes are vertical, said beam moves in a horizontal direction, comprising means for mixing said gate signals with said video signals before they are applied to said second gate circuit means.

3. A color television receiver comprising an image reproducing device having a screen and electron gun means for directing a beam of electrons toward said screen, said screen comprising a plurality of groups of parallel phosphor stripes responsive to said beam to reproduce color information, said groups being separated by indexing stripes extending parallel to said phosphor stripes, said indexing stripes being responsive to said beam to produce a indexing signal, means for scanning said beam in a direction normal to said stripes, first gate circuit means, means applying said indexing signals to said first gate circuit means, a source of a video signal, second gate circuit means, a source of a reference voltage, means applying said video signal and reference voltage to said second gate circuit means, means applying the output of said second gate circuit means to said electron gun to modulate said beam, means for operating said first and second gate circuit means comprising means providing gate signals, means applying said gate signals to said first and second gate circuit means, and means connected to the output of said first gate circuit means for controlling the frequency of said gate signals, whereby said video signals and reference voltage are alternately applied to said electron gun and said first gate means is opened when said beam traverses an indexing stripe, frequency of said gate signals being integrally related to and no greater than the rate at which said beam scans successive said indexing stripes.

4. The receiver of claim 3, in which said means providing said gate signals comprises means for opening said first gate circuit means for a period exceeding the time required for said beam to scan one index stripe.

5. A color television receiver comprising an image reproducing device having a screen and electron gun means for directing a beam of electrons toward said screen, said screen comprising a plurality of groups of parallel phosphor stripes responsive to said beam to reproduce color information, said groups being separated by indexing stripes extending parallel thereto and being responsive to said beam to produce indexing signals, means for scanning said beam in a direction normal to said stripes, first gate circuit means, means applying said indexing signals to said first gate circuit means, a source of video signals, second gate circuit means, means applying said video signals to said second gate circuit means, means applying the output of said second gate circuit means to said electron gun means to modulate said beam, generator means providing a gate signal of a predetermined frequency, means applying said signal to said first and second gate circuit means, and means connected to the output of said first gate circuit means for controlling the frequency of said gate signals, said predetermined frequency being integrally related to and no greater than the rate at which said beam scans successive said indexing stripes.

6. The circuit of claim 5, in which said means for controlling the frequency of said gate signals comprises phase detector means for comparing the phase of the output of said first gate means and the output of said generator means, and means for controlling the frequency of said generator means with the output of said phase detector means.

7. The circuit of claim 5, in which said means for controlling the frequency of said gate signals comprises means for directly synchronizing said generator means.

8. The circuit of claim 5, comprising means applying a search voltage to said oscillator means when said oscillator and indexing signals are out of synchronization.

9. A color television receiver comprising an image reproducing device having a screen and electron gun means for directing a beam of electrons toward said screen, said screen comprising a plurality of groups of parallel phosphor stripes responsive to said beam to reproduce color information, said groups being separated by indexing stripes extending parallel thereto and being responsive to said beam to produce indexing signals, means for scanning said beam in a direction normal to said stripes, first gate circuit means, means applying said indexing signals to said first gate circuit means, a source of video signals, second gate circuit means, means applying said video signals to said second gate circuit means, means applying the output of said second gate circuit means to said electron gun means to modulate said beam, a source of gate signals comprising monostable trigger circuit means, means applying the output of said first gate circuit means to said trigger circuit means, and means applying the output of said trigger circuit means to said first and second gate circuit means.

10. A color television receiver comprising an image reproducing device having a screen and electron gun means for directing a beam of electrons toward said screen, said screen comprising a plurality of groups of parallel phosphor stripes responsive to said beam to reproduce color information, the phosphor stripes of each group being separated, indexing stripes extending parallel to said phosphor stripes between each of said groups of phosphor stripes, each indexing stripe means comprising a central part separated from the phosphor stripes on each side by a second part, said central parts having a higher secondary emission coefficient than said second part and having a much higher secondary emission coefficient than said phosphor stripes, said indexing stripes being responsive to said beam to produce an indexing signal, means for scanning said beam in a direction normal to said stripes, first gate circuit means, means applying said indexing signals to said first gate circuit means, a source of a video signal, second gate circuit means, means applying said video signal to said second gate circuit means, means applying the output of said second gate circuit means to said electron gun means to modulate said beam, means for opening said first and second gate circuit means comprising means providing gate signals, means applying said gate signals to said first and second gate circuit means, and means connected to the output of said first gate circuit means for controlling the frequency of said gate signals, said frequency being integrally related to and no greater than the rate at which said beam scans successive said indexing stripes.

(References on following page)

References Cited by the Examiner

UNITED STATES PATENTS

| | | | |
|---|---|---|---|
| 2,736,764 | 2/56 | Bingley | 178—5.4 |
| 2,752,418 | 6/56 | Clapp | 178—5.4 |
| 2,848,531 | 8/58 | Creamer et al. | 178—5.4 |
| 2,896,016 | 7/59 | Thompson | 178—5.4 |
| 2,921,119 | 1/60 | Schwartz | 178—5.4 |

FOREIGN PATENTS

| | | |
|---|---|---|
| 839,986 | 6/60 | Great Britain. |

DAVID G. REDINBAUGH, *Primary Examiner.*

NEWTON N. LOVEWELL, ROBERT SEGAL, *Examiners.*